United States Patent [19]
Werner et al.

[11] Patent Number: 5,206,698
[45] Date of Patent: Apr. 27, 1993

[54] LIDAR ARRANGEMENT FOR MEASURING ATMOSPHERIC TURBIDITIES

[75] Inventors: Christian Werner, Munich; Jürgen Streicher, Germering; Wilhelm Krichbaumer, Munich; Hartmut Herrmann; Ulrich Oppel, both of Woerthsee; Eberhard Gelbke, Uetersen; Christoph Münkel, Hamburg; Uwe F. W. Berghaus, Wedel/Holstein, all of Fed. Rep. of Germany

[73] Assignees: DLR Deutsche Forschungsanstalt für Luft-und Raumfahrt, Köln; Impulsphysik GmbH, Hamburg, both of Fed. Rep. of Germany

[21] Appl. No.: 416,652

[22] Filed: Oct. 3, 1989

[30] Foreign Application Priority Data

Oct. 5, 1988 [DE] Fed. Rep. of Germany ..... 38338351

[51] Int. Cl.$^5$ ............. G01C 3/08; G01N 21/00; G06F 7/70; B60T 7/16
[52] U.S. Cl. ........................ 356/5; 180/167; 356/342; 356/343; 356/364; 356/369; 364/424.01; 364/426.01; 364/426.04
[58] Field of Search .......... 356/4, 5, 342, 343, 356/364, 369; 364/424.01, 426.01, 426.04; 180/167

[56] References Cited

U.S. PATENT DOCUMENTS

| | | |
|---|---|---|
| 3,446,556 | 5/1969 | Collis . |
| 3,653,767 | 4/1972 | Liskowitz ................. 356/342 X |
| 3,782,824 | 1/1974 | Stoliar et al. ............. 356/342 |
| 4,333,008 | 6/1982 | Misek .................... 356/364 |
| 4,362,388 | 12/1982 | Egan et al. ............. 356/343 X |

FOREIGN PATENT DOCUMENTS

| | | |
|---|---|---|
| 2328092 | 12/1973 | Fed. Rep. of Germany . |
| 2351972 | 4/1975 | Fed. Rep. of Germany . |
| 2511538 | 9/1976 | Fed. Rep. of Germany . |
| 3786 | 10/1983 | Fed. Rep. of Germany . |
| 0172032 | 8/1986 | Japan .................. 356/343 |

OTHER PUBLICATIONS

Earnshaw et al., "A Feasibility Study of Identifying Weather by Laser Forward Scattering," *Journal of Applied Meteorology*, vol. 17, No. 10, Oct. 1978, pp. 1476-1481.

S. Jorna "Atmospheric Depolarization and Stimulated Brillouin Scattering" Dec. 1971/vol. 10, No. 12/Applied Optics, 2661-2664.

(List continued on next page.)

*Primary Examiner*—Stephen C. Buczinski
*Attorney, Agent, or Firm*—Michael J. Striker

[57] ABSTRACT

The lidar arrangement (1) has a transmitter (3) for linearly polarized radiation (12), a receiver (5) with a first receiving device which measures intensity of the backscattered radiation (15) coinciding approximately with the transmitted radiation cone (12) in a polarization plane of the cone and in a perpendicular polarization plane, wherein the receiver further includes a second receiving device which measures the intensity of backscattered radiation (17) outside the transmitted cone (12), the outer backscattered radiation has the shape of a conical shell which surrounds the backscattered conical shell of the first mentioned backscattered radiation (15) and of the transmitted cone (12); the received separate radiation cones (15 and 17) are split in a polarization analyzing optical element into two mutually perpendicular partial light beams, each consisting of an inner partial beam portion (15a, 15b) and an outer partial beam portion (17a and 17b), the inner and outer partial beam portions are separately detected and the resulting output signals are amplified by an amplification factor which depends on the distance of the lidar from a visibility obstacle, the distance-corrected amplified signals are evaluated in a signal processing unit to distinguish between different kinds of the visibility obstacle, and the evaluated obstacle such as fog, rain, snow or solid obstacle and a distance thereof are indicated on corresponding indicators.

12 Claims, 4 Drawing Sheets

OTHER PUBLICATIONS

W. R. McNeil and A. I. Carswell, "Lidar Polarization Studies of the Troposphere" Sep. 1975/vol. 14, No. 9/Applied Optics, 2158–2168.

Dennis K. Kreid, "Atmospheric Visibility Measurement by a Modulated CW Lidar" Jul. 1976/vol. 15, No. 7/Applied Optics, 1823–1831.

V. E. Derr "Estimation of the Extinction Coefficient of Clouds from Multiwavelength Lidar Backscatter Measurements" Jul. 15, 1980/vol. 19, No. 14/Applied Optics 2310–2314.

E. R. Murray, M. F. Williams, and J. E. van der Laan "Single-Ended Measurement of Infrared Extinction Using Lidar" Jan. 15, 1978, vol. 17, No. 2/Applied Optics 296–299.

LIDAR ARRANGEMENT FOR MEASURING ATMOSPHERIC TURBIDITIES

BACKGROUND OF THE INVENTION

The present invention relates to a lidar arrangement for measuring various atmospheric turbidities, for determining causes of turbidity of gases and for indicating a distance of a visibility obstacle in the atmosphere.

It has been known to perform by a lidar transmission-, extinction- and backscatter measurement in the atmosphere in order to identify gases or particles present in the atmosphere, to measure their concentration and distance from the lidar station. Such known applications have been described for example in the publication of V. E. Derr, "Estimation of the extinction coefficient of clouds from multiwavelength lidar backscatter measurements", Applied Optics, Vol. 19, No. 14, pp. 2310–2314 for examining clouds, of J. S. Randhawa et al., "Lidar observations during dusty infrared test-1", Applied Optics, Vol. 19, No. 14, pp. 2291–2297, for the backscatter- and transmission measurements of explosion of TNT by means of a lidar equipped with $CO_2$-or Rubin-laser, and of D. K. Kreid, "Atmospheric visibility measurement by a modulated cw lidar", Applied Optics, Vol. 15, No. 7, pp. 1823–1831. In addition, the measurement of absorption and/or scattering of light in the atmosphere is disclosed for example in DE-OS 23 51 972 and DE-OS 23 28 092.

In the above mentioned patent publications a lidar is disclosed whose laser beam is transmitted via a transmission optical system. The transmitted laser radiation is absorbed and scattered in the atmosphere. A reception optical system whose aperture angle corresponds approximately to the aperture or apex angle of the transmitted laser beam, measures scattered light. Since the wavelength of the laser is known, from the intensity of the scattered light, the known dispersion cross-sections of different gases and particles as well as from the spectral absorption, the extinction coefficients of the atmosphere and thus the density of admixed gases and particles can be determined.

Known is also a lidar of a different kind wherein two laser beams of neighboring wavelengths are used whereby one of the wavelengths is subject to a particularly strong absorption or scattering by a gas to be determined while almost no absorption or scattering by this gas is exerted on the other wavelength. The "unaffected" backscattered laser radiation serves as a reference for the absorption of the gas to be determined in the atmosphere.

Due to the fact that the intensity of the backscattered light decreases with higher than square power of the distance of the scattering volume from the lidar, there are employed electronic gating circuits which evaluate only a certain distance range. As a rule, the lasers transmit short radiation pulses in the magnitude order of several tens nanoseconds; of course, modulated continuously operated lasers have been also employed.

The known lidar embodiments are suitable for measuring extinction coefficients of the atmosphere in general, and for measuring the extinction of an admixed gas or particles. The disadvantage of the prior art lidars is the fact that they are unsuitable to distinguish in an unambiguous and fast way different kinds of atmospheric turbidities, such as for example snow from fog, rain or solid visibility obstacles.

SUMMARY OF THE INVENTION

It is, therefore, an object of this invention to provide an improved lidar arrangement which is capable of providing a fast and unambiguous distinction among different atmospheric turbidities or cloudings, such as for example to distinguish snow, fog, and rain one from the other.

In keeping with this object and others which will become apparent hereinafter, one feature of this invention resides in the provision of a lidar arrangement for measuring backscattered light received at two mutually separated reception regions and including a transmitter for transmitting a light beam at a given aperture or apex angle, a receiver having a first and a second reception device for the back-scattered part of the transmitted light beam, the respective devices having reception optical systems designed such that their reception regions do not overlap, and an evaluation device for evaluating electrical signals of the first and second receiving device to determine the kind of turbidities in the atmosphere.

In a modification of this arrangement for determining the causes of turbidities or cloudings of gases, the light transmitter is designed for transmitting linearly polarized radiation, the receiver including a first receiving device having a first detector for detecting a part of backscattered radiation which propagates parallel to the transmitted rays and which is polarized parallel to the polarization direction of the transmitted rays, and a second detector for detecting rays backscattered parallel to the transmitted rays and being polarized perpendicularly to the polarization direction of the transmitted rays. The evaluation device determines from the ratio of the electrical output signals of the two detectors the causes of the turbidities. In another modification for use in motor vehicles to indicate distance of a visibility obstacle, the transmitter transmits pulses of the radiation and the evaluation device includes means for evaluating time intervals between pulses received by one of the receiving devices.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
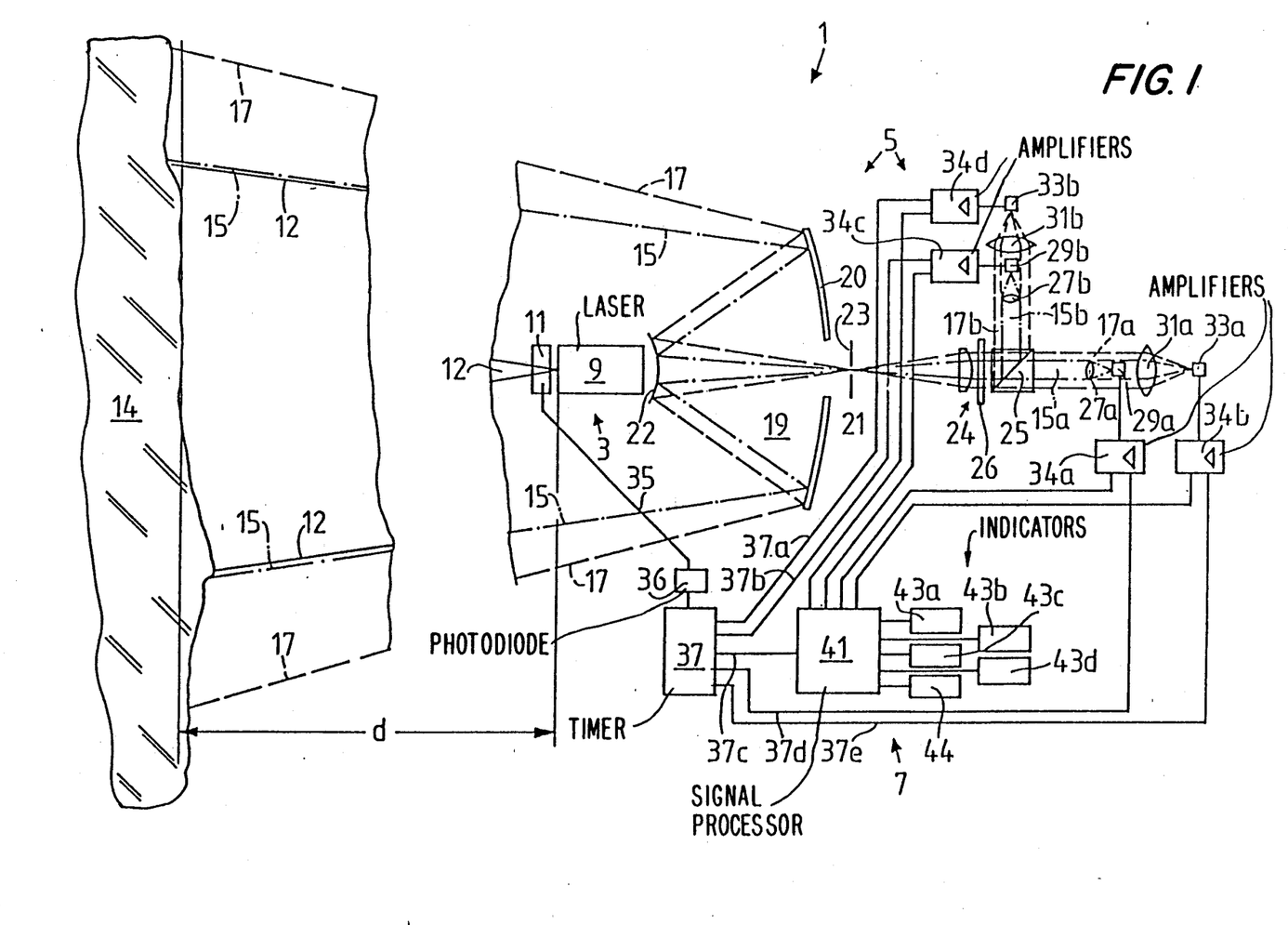
FIG. 1 is a schematic representation of an embodiment of the lidar arrangement of the invention.

The lidar arrangement 1 illustrated in FIG. 1 includes a transmitter 3, a receiver 5 and an evaluation device 7. The transmitter 3 is a laser 9 which emits pulses of linearly polarized radiation in an infrared wavelength range over 1.4 um so that the emitted radiation beam is not detrimental to human eye. The electrical field vector of the linearly polarized radiation of the laser 9 lies in the plane of the drawing. The radiation beam exiting from the laser 9 is converted by a transmitter optical system 11 into a radiation cone 12 whose apex angle is approximately 10 mrad.

At a distance d in front of the lidar 1 fog cloud or screen 14 is present into which the transmitted radiation cone 12 penetrates and is partially scattered or reflected back by fog particles in the direction parallel to the transmitted light cone, as indicated by dash and dot line 15. An additional part of the impinging radiation cone 12 is subjected to a multiple scattering and is reflected back toward the lidar 1 outside the transmitted radiation cone 12, primarily in the form of a converging radiation cone 17 whose apex angle is between 10 to 30 mrad. For the sake of clearness, the magnitude of apex angles of the illustrated radiation cones 12, 15 and 17 is strongly exaggerated.

A first receiving device for detecting the light cone 15 includes a Cassegrain reflecting arrangement 19 including a concave main mirror 20 provided with a central aperture and a convex collecting mirror 22 arranged coaxially opposite the central aperture 21 of the main mirror (see H. Haferkorn, "Optik", page 608), a diaphragm 23, an optical system 24 which converts the cones of rays 15 (and 17, as it will be explained later on) into parallel rays and a narrow band filter 26 passes through only those rays whose spectral range originates from the laser of the transmitter 3. The filtered radiation rays enter a Wollaston prism 25 which splits each of the radiation beams 15 and 17 into two partial beams 15a, 15b and 17a, 17b. The concentric partial beams 15a and 17a are focused respectively by focusing lenses 27a and 31a onto photodiodes 29a and 33a acting as radiation detectors. Similarly, the other concentric partial beams 15b and 17b exiting from the prism 25 at right angles to the first partial beams, are focused by focusing lenses 27b and 31b onto photodiodes 29b and 33b acting as second radiation detectors. The Wollaston prism 25 is designed such that it passes through in the same direction the part of linearly polarized rays of the beam 15 whose electrical field vector is parallel to the electrical field vector of the transmitted radiation cone 12, that means the field vector of the partial beam 15a lies in the plane of the drawing. The rays whose polarization is perpendicular to that of the transmitted cone 12 is deflected at right angles in the Wollaston prism 25 and exits as a partial stream 15b.

A second receiving device serves for the detection of the outer radiation cone 17 of the scattered radiation. It shares with the first receiving device the Cassegrain reflecting arrangement 19, the diaphragm 23, the optical system 24, the narrow band filter 26 and Wollaston prism 25. In the Wollaston prism, as described before, the incoming light beam 17 is splitted into a linearly polarized partial beam 17a whose electrical field vector is oriented in the plane of the drawing and a linearly polarized partial stream 17b whose polarization plane is perpendicular to that of the partial beam 17a. The intensity of the partial beams 17a and 17b is detected by the photodiode 33a and 33b.

The electrical signals at the output of respective photodiodes 29a, 29b, 33a and 33b depend on the radiation intensity $I_{15p}$, $I_{15n}$, $I_{17p}$ and $I_{17n}$ of the corresponding radiation signals. The electrical output signals are amplified in assigned amplifiers 34a through 34d whose amplification is adjustable, as it will be described below.

A small part of radiation beam exiting from the laser 9 is conducted by light conductor 35 to a photodiode 36 whose output is connected to a timing circuit 37 which has five outputs 37a through 37e. The output 37e of the timing circuit is connected to an input of the signal processing unit 41 and each of the remaining four outputs 37a through 37d is connected to an input of four amplifiers 34a through 34d. The outputs of the signal processing unit 41 are connected to four indicators 43a through 43d provided respectively with inscriptions solid obstacle, fog, snow and rain. A fifth output of the signal processing unit 41 is connected to indicator 44 which indicates the distance d between the lidar 1 and an obstacle for example in the form of the fog screen 14.

The measuring operation of the lidar of FIG. 1 is as follows:

The laser 9 transmits pulses of radiation having a pulse width of several tens nanoseconds and a repetition frequency of several hundred cycles per second. The transmitted pulses are converted by the transmitter optical system 11 into a conical beam 12 having an apex angle of about 10 mrad. The fog cloud or screen 14 is spaced apart from the lidar 1 at a distance d equals 200 meters. A minute part of every laser pulse reaches via the light conductor 35 the photodiode 36 which triggers the timing circuit 37. The timing circuit 37 is designed such that after the first laser pulse its outputs 37a through 37e deliver after 60 nanoseconds digitally coded information "90.0" corresponding to the running time of 60 nanoseconds for a forward and backward path of 180 meters, that means a distance d=90 meters of a possible visibility obstacle. Through the digital coded information the amplifiers 34a through 34d are adjusted for a period of about 10 nanoseconds to an amplification factor which is sufficient for amplifying the electrical signal of the corresponding photodiodes 29a, 29b, 33a and 33b. The signal represents backscattered radiation from a visability obstacle which is supposed to be at a distance of 90 meters. After about 1 millisecond (corresponding to the set repetition frequency of the laser pulses) a further laser pulse is transmitted and a timing circuit 37 now delivers after 70 nanoseconds digitally coded information "91.5" corresponding to a possible visibility obstacle at a distance of 91.5 meters from the lidar 1. The digitally coded data are again applied to the control inputs of the amplifiers 34a through 34d and to an input of the signal processing unit 41, and so on.

Inasmuch as the intensity of the backscattered radiation cones 15 and 17 decreases with higher than the square power of the distance, the receiver operates with an electronic window wherein a path is subdivided into small partial ranges and after every transmitted laser pulse another partial range is tested as to the backscattered radiation of the currently transmitted pulse. In this manner a strong scattered radiation in the proximity to lidar 1 can be suppressed and the amplification of the received signals is adjusted such that the level or amplitudes of the signals is distance corrected. The distance of the spatial region that scatters back the radiation is given by the switch-on time of the electronic window. The geometric resolution of the distance results from the opening time interval of the window (10 nanoseconds = 1.5 meters).

Since the fog screen 14 occurs at first in the 200 meter distance, the above described measurement delivers no signal. Only when the timing circuit 37 after 1,340 nanoseconds has delivered the digitally coded information "201" to the amplifiers unit 34a through 34d and to the input of the signal processing unit 41, the photodiode 29a starts receiving the partial beam 15 of the backscattered radiation whose polarization plane is parallel to that of the radiation beam 12 from the laser; the photodiodes 33a and 33b start receiving the outer partial beam 17a of the multiple scattered radiation.

Referring to FIGS. 2 to 6, the abscissa d denotes on a linear scale the distance d of the lidar from an atmospheric turbidity or visibility obstacle and the ordinate denotes on a logarithmic scale the intensity of the received backscattered radiation. With the subsequent laser pulses the backscattered radiation is successively received from spatial partial ranges which are incrementally further away by 1.5 meters with each laser pulse.

Figure 2A:
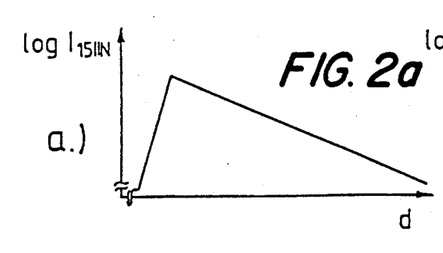
FIGS. 2a–d shows an ideal distance corrected lidar signal of a fog screen or cloud.

Referring to FIG. 2a showing the distance-corrected level or amplitude of the electrical signal $I_{15p}$ of the photodiode 29a after amplification in amplifier 34a corresponding to the parallel polarized backscattered radiation 15, it will be seen that the logarithm of the signal $I_{15p}$ steeply increases with the distance d to a maximum value $I_{max}$ and then linearly decreases to the initial low value.

Figure 2B:
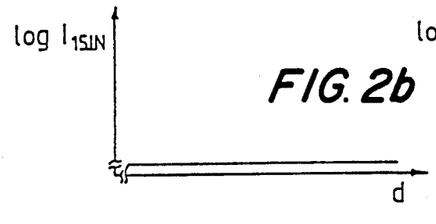
Figure 2C:
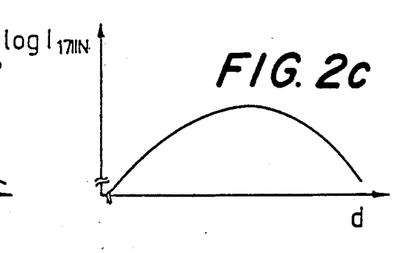
Figure 2D:
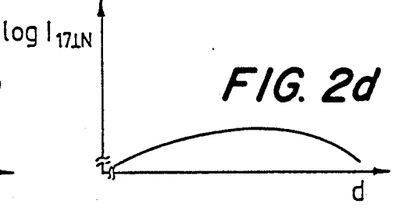

FIGS. 2c and 2d show the course of electrical signals $I_{17p}$ and $I_{17n}$ of the photodiodes 33a and 33b after being distance-corrected in the amplifiers 34b and 34d. The signals correspond to the received multiple scattered radiation beam 17 surrounding the inner beam 15 which has been subjected to low scatter only.

FIG. 2b shows the graph of the distance-corrected signal $I_{15n}$ corresponding to backscattered light with normal or perpendicular polarization of the inner beam 15. It will be seen that the logarithm of the amplitudes of the signals $I_{17p}$ and $I_{17n}$ increases along a curved path to a maximum value and then decrease to an initial low value. The signal $I_{15n}$ in contrast has a constant value above a noise level.

Figure 3:
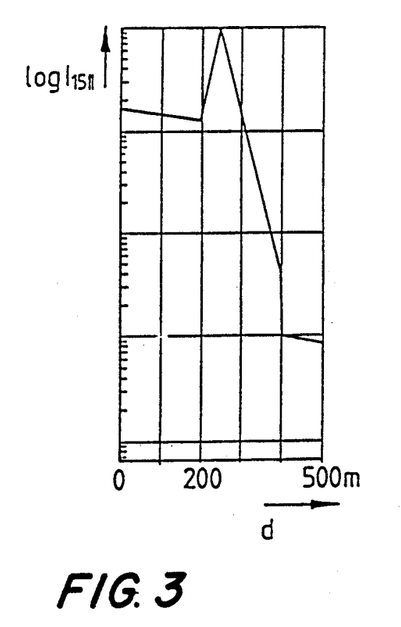
FIG. 3 is an ideal distance non-corrected lidar signal of a fog screen.
Figure 4A:
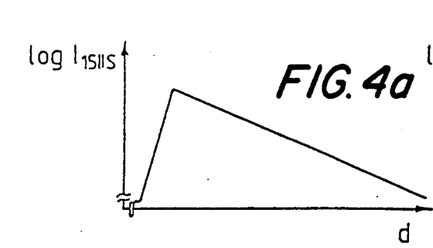
FIGS. 4a–d is an ideal distance corrected lidar signal of a snow screen.
Figure 4B:
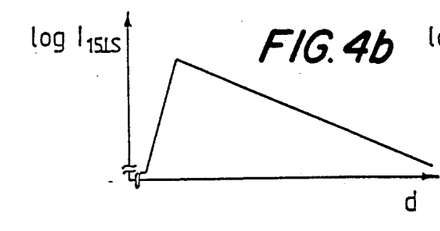
Figure 4C:
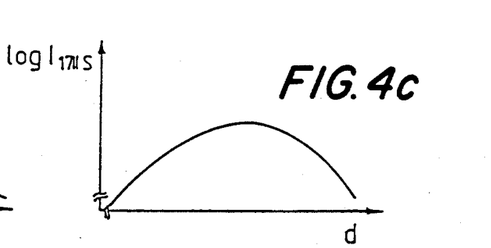
Figure 4D:
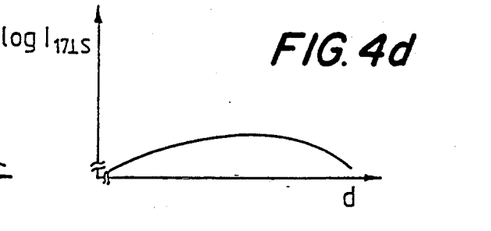
Figure 5A:
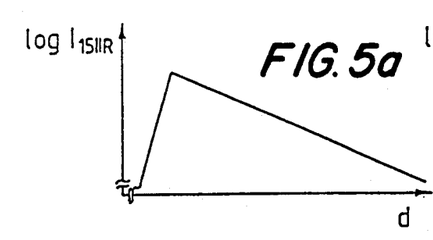
FIGS. 5a–d is an ideal distance corrected lidar signal of a rain screen.
Figure 5B:
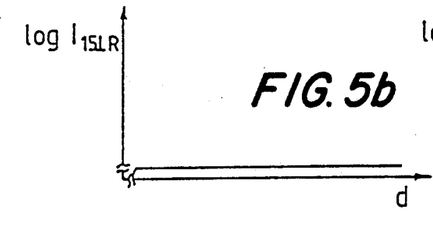
Figure 5C:
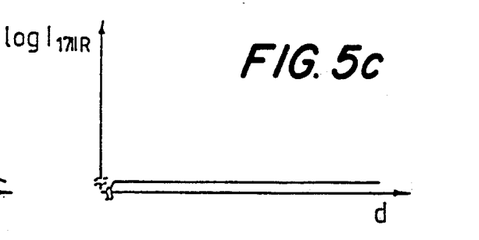
Figure 5D:
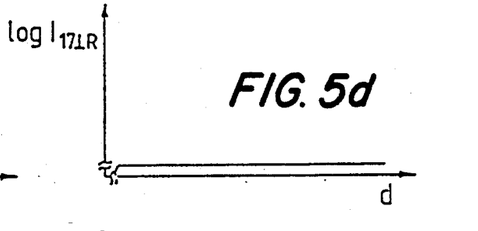

The diagram in FIG. 3 shows the signal $I'_{15p}$ at the output of the photodiode 29a prior to its distance correction. In this example, the distance d plotted on the ordinate is up to 500 meters, whereby at a distance of 200 meters from the lidar a fog screen or cloud of a thickness of 200 meters is present.

If the measurements of FIGS. 2 and 3 encounter a corresponding screen or cloud of snow or rain, then for snow graphs according to FIGS. 4a–4d and for rain the graphs according to FIGS. 5a to 5d would result. To distinguish the measuring results according to the encountered visibility obstacles, in the following description the measured distance corrected ideal signal values are designated as $I_{15pF}$, $I_{15nF}$, $I_{17pF}$ and $I_{17nF}$ for a fog cloud, $I_{15pS}$ to $I_{17nS}$ for a snow cloud and $I_{15pR}$ through $I_{17nR}$ for rain clouds.

Surprisingly, from the above described measurements the following results had been obtained:

In the case of a fog cloud 14 the distance corrected signals $I_{15pF}$, $I_{17pF}$ and $I_{17nF}$ have maxima but signal $I_{15nF}$ has no maximum (FIG. 2);

In the case of a snow cloud all distance corrected signals $I_{15pS}$, $I_{15nS}$, $I_{17pS}$ and $I_{17nS}$ have maxima (FIG. 3);

In the case of a rain cloud only the distance corrected signal $I_{15pR}$ has a maximum, whereas the remaining signals $I_{15nR}$, $I_{17pR}$ and $I_{17nR}$ have no maximum (FIG. 5).

Figure 6:
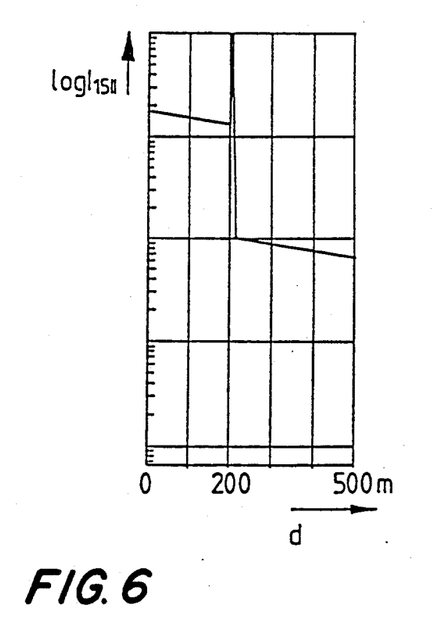
FIG. 6 is an ideal distance non-corrected lidar signal of a solid visibility obstacle.

In the case of a solid visibility obstacle, a distance non-corrected signal $I'_{15pH}$ at the output of photodiode 29a is illustrated in FIG. 6. In contrast to the corresponding signal of FIG. 3, the signal $I'_{15pH}$ has a needle-like shape. Depending on the surface quality of the solid obstacle (reflecting or diffusing) there can be also detected a signal component $I'_{15nH}$.

According to the above listed criteria, the signal processing unit 41 determines non-ambiguously whether the measured visibility obstacle is a fog-, snow- or rain cloud or a solid obstacle. In the case of fog-, snow- or rain clouds the signal processing unit 41 determines by means of the digitally coded values received from the timing circuit 37 the corresponding distance value d for every measurement. The distance value d lies approximately midway of the curve of signals $I_{15pF}$, $I_{15pS}$ or $I_{15pR}$. In the case of a solid visibility obstacle, the sharp, needle-shaped configuration of the signal $I'_{15pH}$ is not correlated to the central part of the characteristic curve. Instead, the distance d is displayed in the indicator 44 as a digital value in meters. In addition, the indicators 43a through 43d selectively light up according to the evaluation results for a fog-, snow- or rain cloud or a solid visibility obstacle.

If a solid obstacle is present within the fog- snow- or rain cloud then a sharp, needle-shaped pulse recognized by the signal processing unit 41 is superimposed to the distance curves according to FIGS. 2a, 2b, 4a, 4b, 5a and 5b. In this case the indicator 43d for the solid visibility obstacle lights up together with one of the indicators 43a, 43b or 43c for the fog-, snow- or rain cloud. As mentioned above, the distance indicator 44 displays the digital value of the distance d of the solid obstacle.

Figure 7:
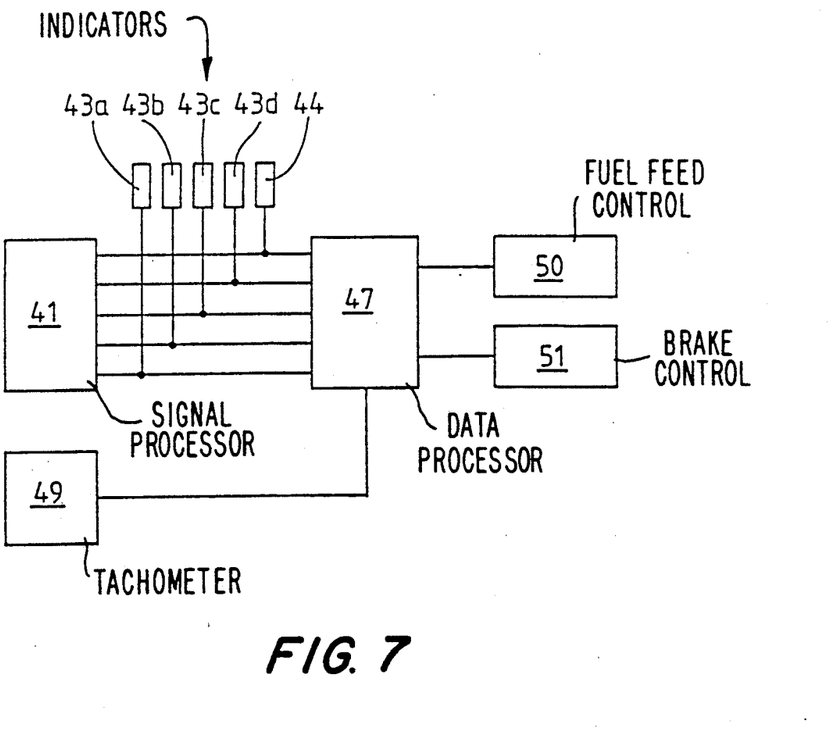
FIG. 7 is a block diagram of additional components of the lidar of FIG. 1 for the speed control of a motor vehicle.

Referring to FIG. 7, there is illustrated a modification of the lidar of FIG. 1 for use as a distance warning device in auto vehicles.

The lidar 1 shown in FIG. 1 in this case is installed in a non-illustrated motor vehicle, whereby the above described measuring process is performed in the direction of travel of the vehicle. The indicators 43a through 43d which light up upon the detection of fog-, snow- or rain cloud or a solid obstacle, provide a valuable assistance to the driver. In addition, data from the signal processing unit 41 is fed into a data processing unit 47 which is also supplied with data from tachometer 49 indicative of the momentary speed of the motor vehicle. The output of the data processing unit 41 is connected to a fuel feed control 50 or to a brake control 51 so that in dependence on the data from the tachometer 49 and from the signal processing unit 41 the speed of the vehicle is adjusted by a corresponding control of the fuel feed or by the application of brakes.

The indicator 43c of a rain cloud is also activated when a leading vehicle whirls up or splashes water from the driveway.

In a variation of the arrangement of this invention, the diodes 33a or 33b can be dispensed with. It will be seen from the above described diagrams that the signals $I_{17p}$ or $I_{17n}$ differ only slightly one from the other. Therefore, one of the photodiodes 33a and 33b together with its amplifier 34b or 34d can be deleted without significantly impairing the measuring results. The use of both diodes 33a and 33b is of advantage under certain environmental conditions when a more exact evaluation is required.

Depending on the desired range of distances d the timing circuit 37 can be designed for setting other initial and final values. Of course, it is also possible to select different repetition frequencies for the pulses of the laser 9 and also for a different resolution than the described 10 nanoseconds for the 1.5 meter resolution.

What is claimed is:

1. A lidar for measuring various atmospheric turbidities, comprising means for transmitting a cone of linearly polarized radiation having a given apex angle; means for receiving backscattered radiation; means for evaluating output signals from said receiving means with regard to different kinds of turbidities in the atmosphere; timing means for controlling evaluation of the output signals from said receiving means with regard to different measuring distances; said receiving means comprising a first and a second receiving device, each device having a reception region which is spatially separated from that of the other device; the reception region of said first receiving device receiving a backscattered radiation part which substantially coincides with the transmitted radiation cone; the reception region of said second receiving device receiving a part of the backscattered radiation which is substantially outside the cone of the transmitted radiation; said receiving devices including a reception optical system designed such that the reception region of said second receiving device surrounds the reception region of said first receiving device; said reception optical system including a polarization analysis optical member; said first receiving device including first and second detecting mean arranged behind said polarization analysis optical member for detecting the intensities of radiation of parallel and perpendicular polarization with respect to the polarization direction of the transmitted radiation cone; said second receiving device including first detecting means arranged with said polarization analysis optical member for detecting the intensity of scattered radiation.

2. A lidar as defined in claim 1, wherein said receiving means include means for adjustably amplifying signals from said detecting means to output a distance corrected signal to said evaluating means; said evaluating means including means for processing the distance corrected signals; and a plurality of indicators connected to said signal processing means to indicate different kind of the visibility obstacle present at a predetermined distance from said receiving means.

3. A lidar as defined in claim 2, wherein said indicating means includes a first indicator for a solid visibility obstacle, said first indicator being activated by the detection of a sharp, needle-shape pulse in the detecting means of the first receiving device.

4. A lidar as defined in claim 3, further comprising a second indicator for indicating a visibility obstacle in the form of a fog cloud, said second indicator being activated when in the first receiving device a distance corrected signal from said second detecting means is negligible with respect to a distance corrected signal from said first detecting means and at least one distance corrected signal from the detecting means of said second receiving device has a slowly ascending and descending characteristic curve.

5. A lidar as defined in claim 4, further comprising a third indicator for rain or splashed water from the ground, said third indicator being activated by a signal processing unit when the distance corrected signals from at least one detecting means of said second receiving device and of the second detecting means of said first receiving device are negligibly small relative to the distance corrected signal from the first detecting means of said first receiving device.

6. A lidar as defined in claim 5, further comprising a fourth indicator for snow, said fourth indicator being activated when distance corrected signals in detecting means of said first receiving device have a substantially equal amplitude and the distance corrected signals in the detecting means of said second receiving device have a slowly ascending and descending characteristic curve.

7. A lidar as defined in claim 6, for use as a warning and distance measuring device adapted to be installed in a motor vehicle, comprising means for measuring running time of the transmitted and backscattered radiation beams to evaluate the distance of a visibility obstacle from which the transmitted radiation is backscattered; and a fifth indicator for displaying the evaluated distance.

8. A lidar as defined in claim 7, wherein said transmitting means transmits radiation pulses at a given repetition rate; and said running time measuring means evaluates the distance by means of corresponding electrical pulses detected in said first receiving device.

9. A lidar as defined in claim 8, further comprising an electronic data processing device having a plurality of inputs connected to the outputs of said signal processing unit and an additional input connected to a tachometer of the motor vehicle to receive data indicative of the momentary speed, and outputs connected to a fuel supply control and to a braking control to adjust speed of the vehicle in dependency on the kind and the distance of a detected visibility obstacle.

10. A lidar as defined in claim 1, wherein said second receiving device includes first detecting means and second detecting means arranged behind said polarization analysis optical member for detecting the intensities of radiation of parallel and perpendicular polarization with respect to the polarization direction of the transmitted radiation cone.

11. A warning device for signalling a distance of a motor vehicle from a viability obstacle, comprising a lidar installed in a motor vehicle, said lidar including means for transmitting a cone of pulsating radiation, the cone having a given apex angle; means for receiving a part of the transmitted radiation backscattered from an obstacle, the receiving means including two receiving devices each having reception region which is spatially separated from that of the other device; polarization analyzing means arranged in said receiving means to split the backscattered parts of radiation received on said separate reception regions into two partial beams forming right angles one with the other; each of said receiving devices having two electro-optical detectors arranged in the path of said partial beams to determine backscattered radiation intensity according to polarization components of radiation oriented parallel and perpendicularly to the polarization direction of the transmitted radiation cone; means for evaluating output signals from said detectors to determine the kind of a visibility obstacle; means for evaluating time intervals between transmitted and received radiation pulses to determine from distance of said obstacle; and warning means for signalling the determined distance of a motor vehicle from said obstacle.

12. A lidar for measuring various atmospheric turbidities, comprising means for transmitting a cone of linearly polarized radiation, said cone having a given apex angle; means for receiving backscattered part of the transmitted radiation, said receiving means having a first receiving device provided with first means for detecting intensity of receiving radiation backscattered in directions parallel to the transmitted cone and polarized parallel to the polarization direction of the transmitted cone; second detecting means for detecting intensity of received radiation backscattered in the directions parallel to the transmitted cone and being polarized perpendicularly to the polarization direction of the transmitted rays; and means for evaluating from the ratio of intensity signals of the first and second detecting means; a second receiving device with means for detecting a part of the backscattered radiation which is outside the range of the radiation part received by said first receiving device; said evaluating means measuring from the ratio of output signals of the detecting means of the second receiving device to the output signal of said first and/or second detecting means of said first receiving device the atmospheric turbidities; and said first and second detecting means of the first detecting device receiving only the part of the backscattered radiation whose directions coincide with those of the transmitted cone.

* * * * *